Oct. 15, 1968     R. O. CHAKROFF     3,405,957

FLEXIBLE TUBE COUPLING

Filed April 3. 1967     6 Sheets-Sheet 1

INVENTOR...
RICHARD O. CHAKROFF
BY
Jerome R. Cox
ATTORNEY

Oct. 15, 1968
R. O. CHAKROFF
3,405,957
FLEXIBLE TUBE COUPLING
Filed April 3. 1967
6 Sheets-Sheet 2
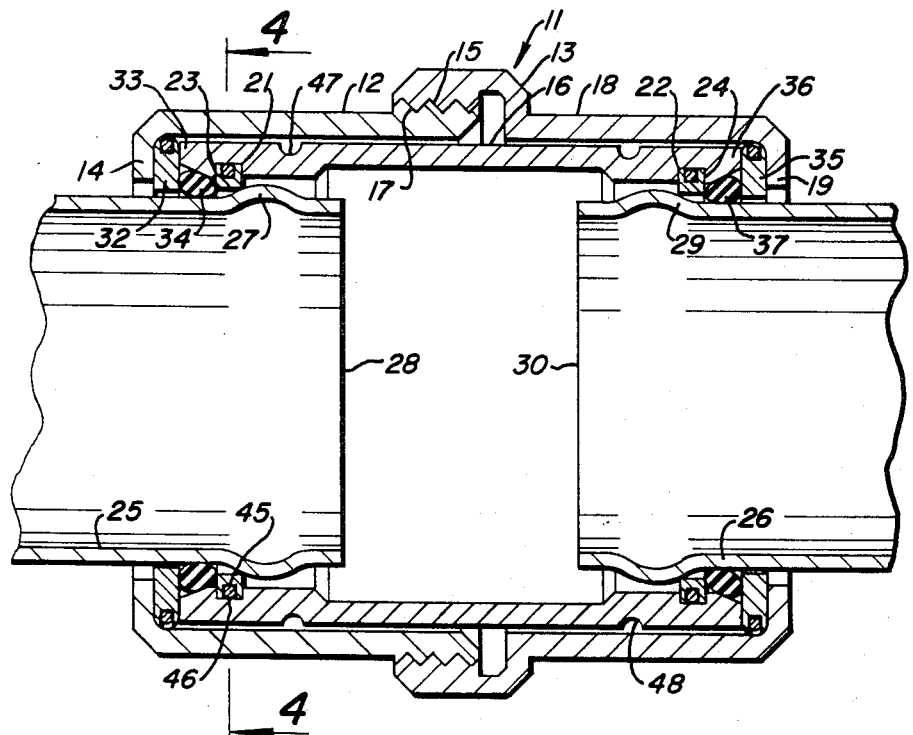
FIG. 3
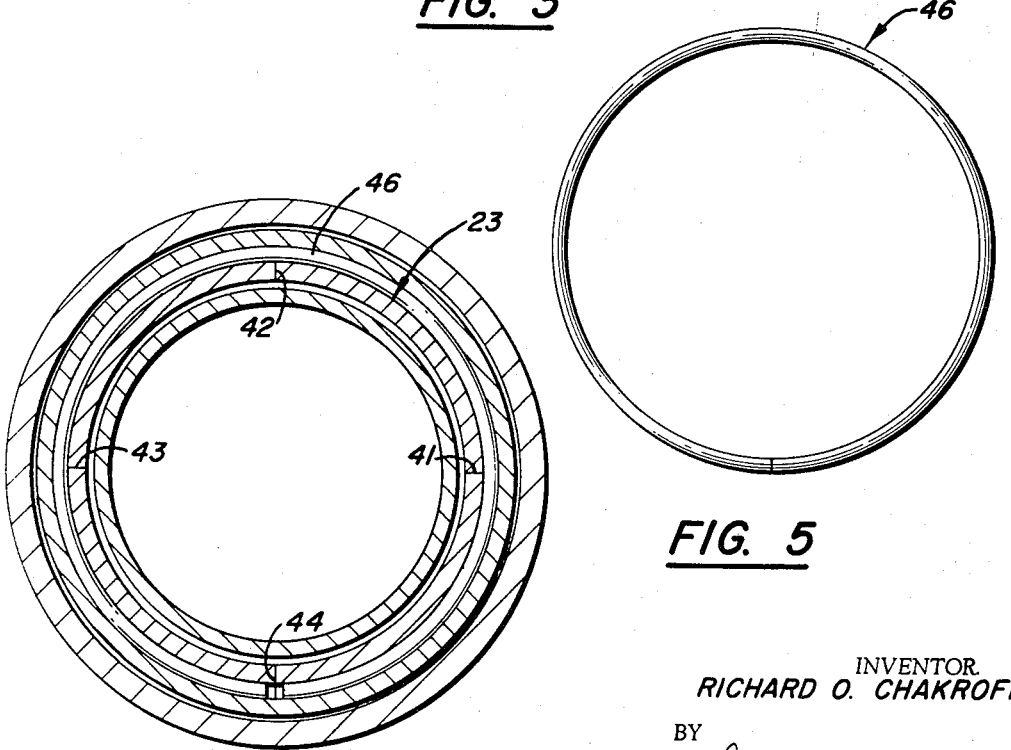
FIG. 4
FIG. 5
INVENTOR.
RICHARD O. CHAKROFF
BY Jerome R. Cox
ATTORNEY Oct. 15, 1968  R. O. CHAKROFF  3,405,957
FLEXIBLE TUBE COUPLING Filed April 3, 1967  6 Sheets-Sheet 3

INVENTOR.
RICHARD O. CHAKROFF
BY Jerome R. Cox
ATTORNEY

Oct. 15, 1968 R. O. CHAKROFF 3,405,957
FLEXIBLE TUBE COUPLING
Filed April 3, 1967 6 Sheets-Sheet 4
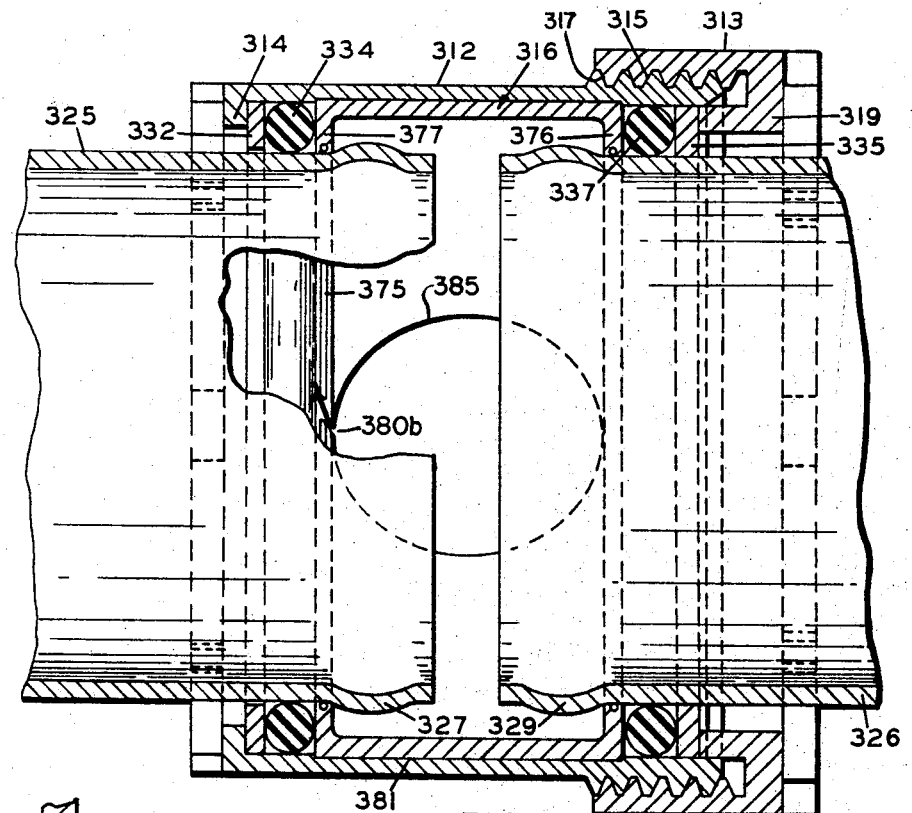
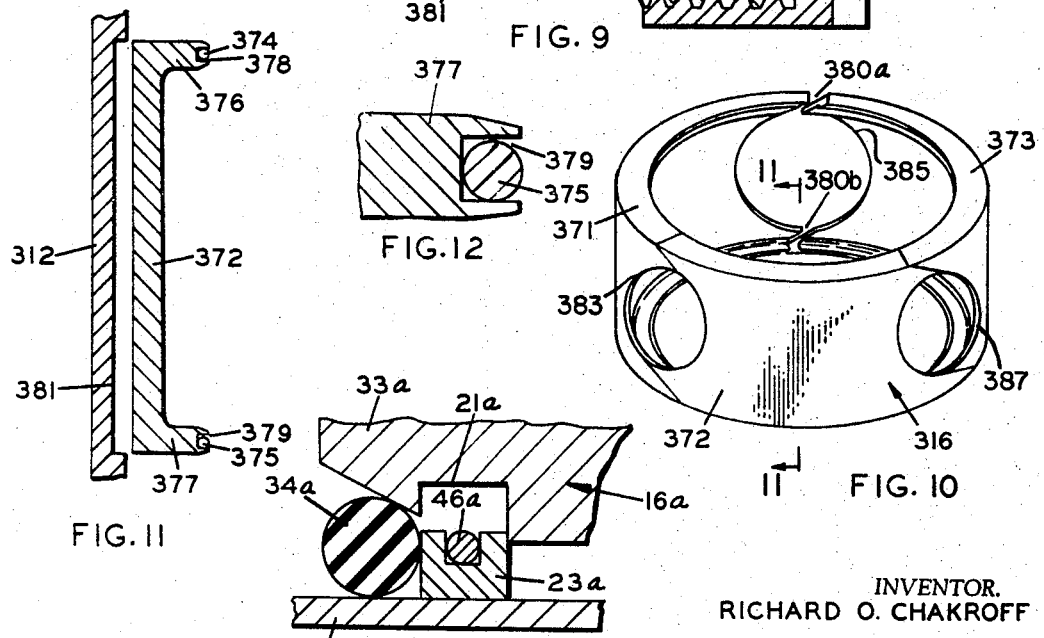
INVENTOR.
RICHARD O. CHAKROFF
BY
Jerome R. Cox
ATTORNEYS Oct. 15, 1968 R. O. CHAKROFF 3,405,957
FLEXIBLE TUBE COUPLING
Filed April 3, 1967 6 Sheets-Sheet 5
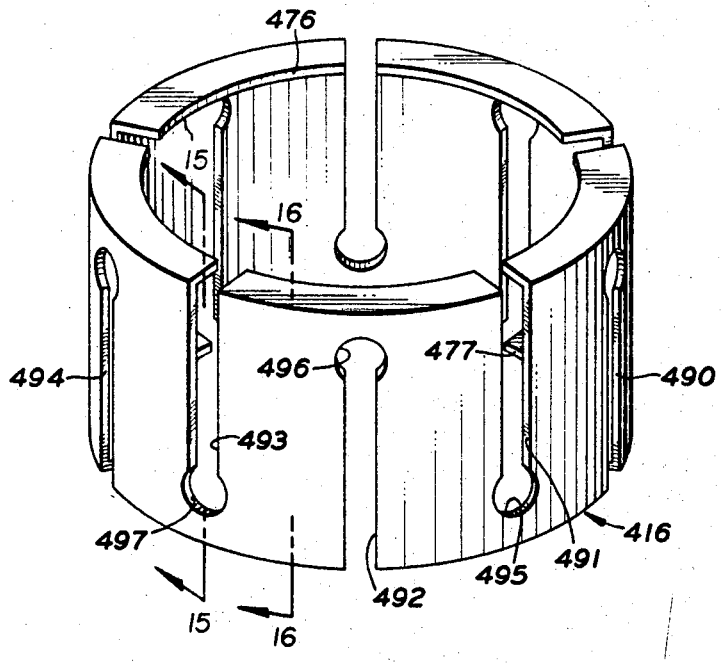
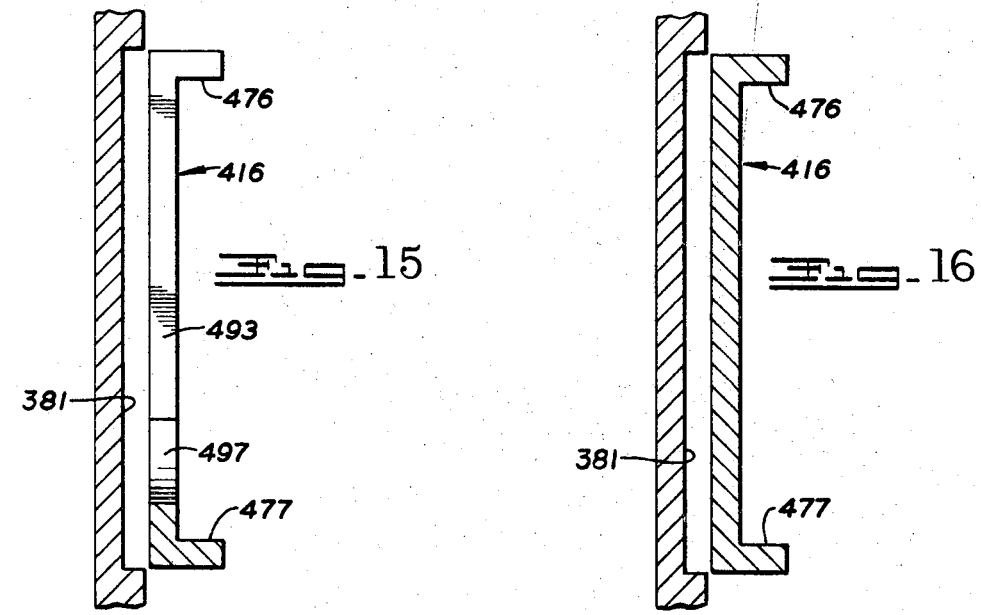
INVENTOR.
RICHARD O. CHAKROFF
BY
Jerome R. Cox
ATTORNEY Oct. 15, 1968  R. O. CHAKROFF  3,405,957

FLEXIBLE TUBE COUPLING

Filed April 3, 1967  6 Sheets-Sheet 6

INVENTOR.
RICHARD O. CHAKROFF
BY
Jerome A. Cox
ATTORNEY

United States Patent Office 3,405,957
Patented Oct. 15, 1968

3,405,957
FLEXIBLE TUBE COUPLING
Richard O. Chakroff, P.O. Box 241,
Worthington, Ohio 43085
Continuation-in-part of application Ser. No. 521,991,
Jan. 20, 1966. This application Apr. 3, 1967, Ser.
No. 629,860
18 Claims. (Cl. 285—93)

ABSTRACT OF THE DISCLOSURE

This application describes a coupling for sealingly joining the beaded ends of two substantially aligned fluid carrying tubes while allowing some misalignment and relative movement of the tubes.

A cylindrical sleeve surrounds the beaded ends of the juxtaposed tubes and has one or more inner circular grooves into which circular rings, surrounding the tubes, are forced by the camming action of the bead whenever the tubes tend to move longitudinally apart. Several and varied embodiments are shown.

Cross reference to related application

This application is a continuation-in-part of my copending application Ser. No. 521,991 filed Jan. 20, 1966, now abandoned. That application was in part a continuation of my application Ser. No. 248,459 filed Dec. 31, 1962, now abandoned.

Background of the invention

*Field of the invention.*—The invention disclosed in this application relates to couplings and more particularly to couplings designed especially for connecting conduits, tubes, pipes, and the like, which carry fluid under pressure. For example, the embodiments of my invention illustrated relate to couplings for connecting together aircraft tubing having external beading adjacent the ends thereof. The embodiments illustrated are designed to seal such tubing even when under the pressures often encountered in such devices.

*Description of the prior art.*—In some respects the invention involved herein bears some resemblance to the invention disclosed in my Patent No. 3,002,771. The inventions have a wide range of applications, but they are particularly well adapted for incorporation in coupling devices for connecting and sealing a pair of fluid pressure conducting tubes, the tubes being arranged in end to end relationship with the ends in approximate alignment and in spaced relationship to each other, each tube having external beading adjacent to the proximal ends thereof and the external surfaces of the tubes being of uniform diameter beyond the distal side of the beading. Thus, my couplings are particularly well adapted for connecting aircraft tubing used in distributing fluid under pressure from one part of an aircraft to another for the purpose of controlling various movable portions of the aircraft, for transmission of fuel between the various fuel tanks of the aircraft, and between such tanks and the aircraft engines and for other purposes. In particular, my couplings are well adapted for connecting the ends of fluid handling pipes or tubes of the class described having beads formed adjacent the ends thereof which beading will be engaged by and cooperate with the coupling devices.

The term "beading" is used throughout this application to denote one type of enlargement that may be provided at or near the ends of fluid conducting tubes. However, other types of enlargements are now available. For example, the ends of the tubes could be flanged or flared or they could be connected with flanged ferrules. Thus tubes with enlargements other than beadings can be used. All that is necessary is that the enlargement be capable of acting as a cam in co-operation with the expandable portions (as, for example, the split rings) of embodiments of my invention. The expandable portions act as the cam follower.

In connecting such tubes, it is necessary to provide and maintain effective seals for preventing leakage of fluid under pressure while at the same time providing for at least some relative or angular pivotal movement as well as longitudinal movement between the tubes. In addition, it is, of course, essential to hold the tubes against separation. In the past, difficulty was encountered in providing couplings of this kind particularly for use with tubes carrying fluid at high or substantial pressures. Some of the earlier couplings employed rings of rubber, etc., compressed against the beads of the tubes or against other surfaces by radial loads developed by clamps or by the endwise or axial loads developed by the internal fluid pressures within the tube system, these rings being depended upon to provide the essential fluid seal. Where the fluid pressure was high and/or where the tubing was large in diameter, the fluid pressure developed heavy end loads tending to separate the adjacent tubes, and these high loads or forces were applied to or transmitted to the yielding sealing rings and soon distorted and extruded the rings to such an extent that they were no longer effective in preventing the leakage of fluid under pressure.

Summary of the invention

My invention involves a coaction between; first, a groove or grooves annularly formed in the inner surface of a cylindrical sleeve; second, a pair of circular rings surrounding the juxtaposed ends of two tubes and positioned both coaxial and coplanar with the annular grooves; and third, the beading near the ends of the two juxtaposed tubes. Longitudinal movement of the tubes relative to the coupling causes the rings to expand into the grooves by means of camming action of the beading on the rings. The rings may be separate rings or they may be part of a unitary body by being formed as flanges on the ends of a collar.

It is an object of the invention disclosed herein, therefore, to provide a simple, practical, and effective coupling of the character herein referred to, that overcomes the shortcomings and difficulties encountered with the couplings heretofore employed.

Another more specific object of the invention is to provide a tube coupling wherein the fluid sealing rings are not subjected to the heavy end loads developed by the internal fluid pressures or by longitudinal or angular movement of the tubing due to wing deflection or high G loads caused by aircraft maneuvers, but are protected therefrom and therefore are not excessively distorted or extruded from between the adjacent or confining surfaces. In the event of excessive distortion or compression of such sealing rings or repeated distortion or compression thereof, the sealing rings might break down and leaks develop. In accordance with my invention, the end loads tending to separate the tubes are transmitted to rigid members of metal or other rigid material forming means for holding said tubes against unlimited displacement. These rigid members cooperate directly with the beads on the tubes. Thus the yielding sealing rings are not themselves utilized as elements of the mechanism or system for mechanically holding the tubes together (or apart) and the rings serve solely as sealing elements. The sealing rings may be actuated to seal by the fluid pressure acting directly upon them.

A further object of my invention is to provide a coupling assembly which may be easily and quickly assembled around the adjacent ends of the tubes (or disassembled) in spite of the fact that the assembly (or disassembly) has to be made in extremely small places where there is little opportunity for manipulation either by hand or tools.

It is another object of the invention to provide a coupling that is flexible to allow the required limited angular relative movement of the connecting tubes and to permit limited longitudinal movement of the tube ends toward and from one another as, for example, during operation and during assembly, and that is unaffected by minor inaccuracies in the length or angles of the tubes being connected.

A further object of the invention is to provide a coupling of the class described that maintains effective dependable fluid tight sealing engagement with the connected tubes.

Other objects and features of the invention will become apparent from the following specification disclosing several embodiments of my invention and from the accompanying drawings illustrating such embodiments and from the claims.

*Brief description of the drawings*

FIG. 3 is a view in vertical section similar to and showing the same structure as that shown in FIG. 2, but showing the thin wall beaded tubing extended into operative relationship, and separated as it may be, at times, when fluid pressure is applied thereto, or because of wing deflection or otherwise, and showing that when so extended the beading of the tubing comes into contact with portions of the coupling members;

FIG. 4 is a view in vertical section taken substantially on the line 4—4 of FIG. 3 but showing the actuating spring of the resilient split ring in elevation;

FIG. 5 is a view in elevation of the spring of FIGS. 2, 3, and 4 shown in its relaxed position when there is no spreading force exerted upon it;

FIG. 9 is a view in vertical section similar to FIG. 2 showing a still different embodiment of my invention;

FIG. 10 is a view in perspective of a sleeve forming a portion of the coupling shown in section in FIG. 9;

FIG. 11 is a view in vertical section of the sleeve of FIG. 10 together with a fragment of the coupling member thereof on a considerably enlarged scale and taken substantially on the line 11—11 of FIG. 10;

FIG. 12 is a fragmentary view in section of a portion of FIG. 11 corresponding substantially to the showing of the portion of FIG. 11 but on a still larger scale;

FIG. 13 is a fragmentary view in section corresponding to a portion of FIG. 2 and showing a modification of a detail thereof on an enlarged scale;

FIG. 14 is a view in perspective of another embodiment of the sleeve, which may be used in my invention, and is an alternate or substitute for the sleeve shown in FIG. 10;

FIG. 15 is a view in vertical section of the sleeve of FIG. 14 together with a fragment of the coupling member shown on a considerably enlarged scale and taken substantially on the line 15—15 of FIG. 14;

FIG. 16 is a view in vertical section of the sleeve of FIG. 14 together with a fragment of the coupling member shown on a considerably enlarged scale and taken substantially on the line 16—16 of FIG. 14.

*Description of the preferred embodiments*

Figure 1:
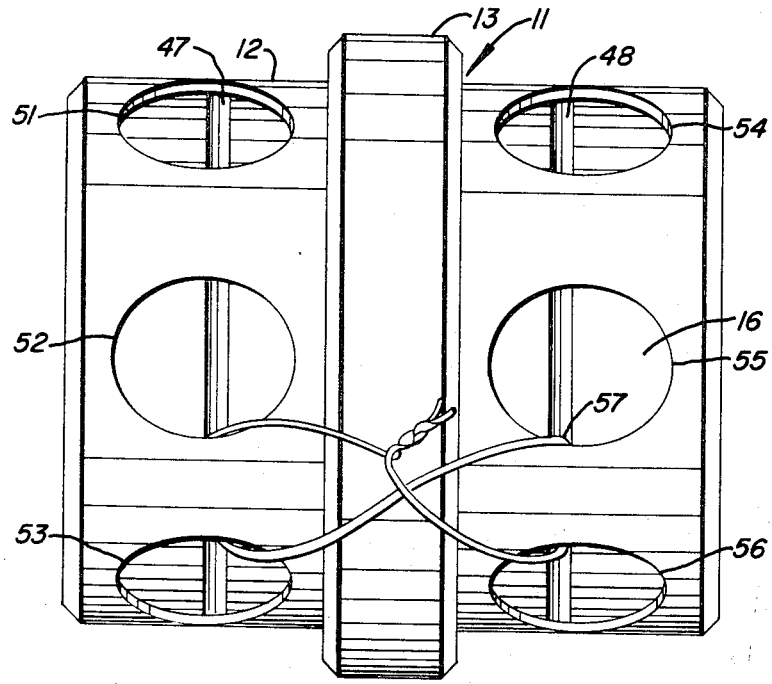
FIG. 1 is a view in elevation of a coupling constructed according to my invention.

Referring still to the drawings, it may be seen there is shown in FIG. 1 a coupling 11 consisting of a cylindrical male threaded coupling member 12 and a nut 13. These are possibly shown more clearly in the section of FIG. 2 where it may be seen that the cylindrical coupling member 12 has an annular internal flange 14 at one end and external threads 15 at the opposite end, that the main body of the coupling member 12 encloses one end of a sleeve 16. It should be especially noted that the inner sleeve 16 is a pressure carrying vessel, while the outer coupling member 12 and nut 13 need not be fluid tight. This is a reversal of previous designs and leads to unexpected and unobvious results. The nut 13 has internal threads 17 threaded onto the external threads 15 of the coupling member. The nut 13 is formed with a cylindrical extension 18, corresponding substantially to the body of the coupling member 12 and a flange 19 corresponding to flange 14, enclosing the other end of the sleeve 16. The internal annular flange 19 is at the end of the cylindrical extension 18 opposite to the internal threads 17. The cylindrical male threaded coupling member 12 and the nut 13 together with elements later to be described, comprise means for sealing the ends of the tube 16 against leakage.

Figure 2:
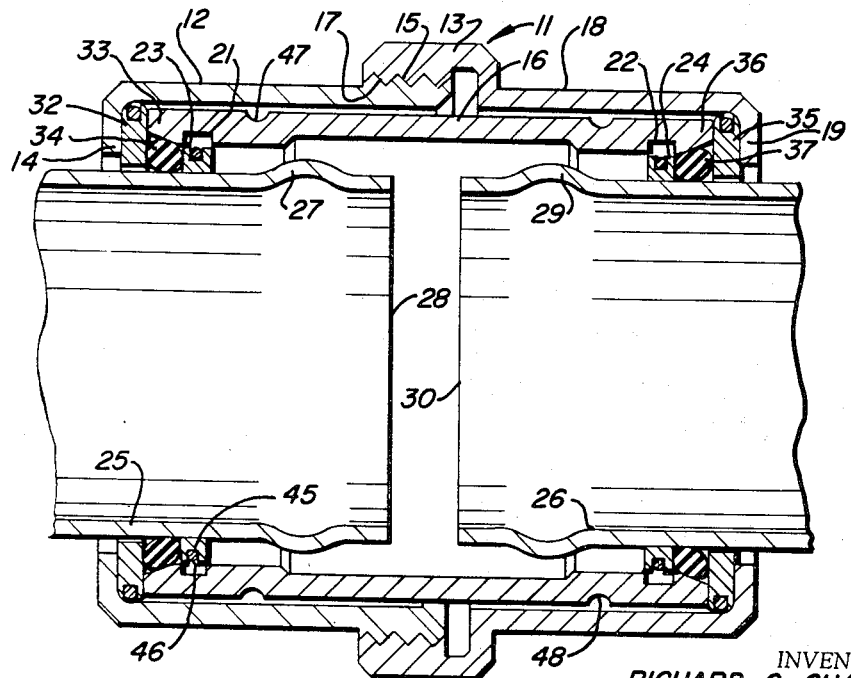
FIG. 2 is a view in vertical section of the coupling of FIG. 1 having shown therewith the end portions of two thin walled fluid pressure conducting tubes of the type used in aircraft, arranged end to end with the ends in substantial or approximate alignment and in spaced relationship to each other, each tube having an external beading adjacent the disclosed proximal ends thereof and the external surfaces of the tubes being of uniform diameter beyond the distal sides of the beading.

The tube 16 is formed with a pair of internal circumferential grooves 21 and 22. The tube 16 is not a split sleeve and is substantially cylindrical and integral. I provide a pair of resilient split rings 23 and 24, each of which is at times partially positioned in one of said grooves 21 and 22, as subsequently explained and as shown in FIG. 3. At other times, as shown in FIG. 2, the resilient split rings 23 and 24 fit snugly against the external diameter of the ends of a pair of pressure conducting tubes 25 and 26 and do not extend into said grooves 21 and 22. Each of these tubes is formed with external beading adjacent to the proximal end thereof and the external surfaces of the tubes on the opposite (or distal) side of said beading from the ends of the tubes are of substantially uniform diameter. As stated above, in the released position of the resilient split rings, as shown in FIG. 2, they fit snugly on the external diameter of the tubes on the side of the beading opposite to the ends of the tube and are withdrawn from the grooves. Thus as shown in FIG. 2, the resilient split ring 23 snugly embraces the external diameter of the tube 25 on the opposite side of the beading 27 from the end 28 and the resilient split ring 24 embraces the external diameter of the tube 26 on the side of the external beading 29 opposite to the end 30. When pressure is increased in the tubes 25 and 26, it sometimes causes the tubes 25 and 26 to move apart. Also, at times, wing deflection and/or high G loads due to maneuvers cause the tubes 25 and 26 to move apart. When the tubes 25 and 26 are moved apart for whatever reason so that the beadings 27 and 29 come into contact with the resilient split rings 23 and 24 respectively, the camming action of the beading 27 and 29 moves the resilient rings 23 and 24 as shown in FIG. 3 into the grooves 21 and 22 of sleeve 16. The substantially cylindrical integral sleeve 16, together with the pair of resilient split rings 23 and 24 positioned in the internal circumferential grooves 21 and 22 of the sleeve 16 (when said tubes 25 and 26 are moved apart to their limit, as for example, by the pressure of fluid contained in said tubes) comprises means for holding tubes 25 and 26 against unlimited axial displacement. The camming action of the external beading on the tubes at the distal side of the external beading of the tubes as it contacts the resilient split rings 23 and 24, is effective, as explained, to move the rings 23 and 24 into the grooves 21 and 22.

The cylindrical integral inner sleeve 16, formed with the pair of internal circumferential grooves 21 and 22, thus cooperates with the resilient split rings 23 and 24 each partially positioned in the grooves 21 and 22 respectively when the tubes 25 and 26 are moved apart to their limit of movement, thus providing means for holding the tubes 25 and 26 against unlimited longitudinal displacement by reason of the fact that the resilient rings 23 and 24 transmit the forces of the tubes 25 and 26 from their respective beads 27 and 29 directly to the sleeve 16. In this way, none of the force is transmitted to the O-rings 34 and 37. Were such forces transmitted to the O-rings, the rings could be caused to break down and leak by reason of the fact that the O-rings might possibly be caused to extrude or become cut, abraded, or torn under vibration.

Within the cylindrical coupling member 12, I position a resilient metallic split washer 32 which is enclosed by said coupling member 12 and positioned intermediate the flange 14 and the adjacent end 33 of the sleeve 16. The structure of this washer may be similar to that of the split rings 23 and 24 and include a spring for increasing its resiliency as indicated in FIGS. 2 and 3. I also provide a resilient O-ring 34 which may be of rubber or any other suitable resilient material for sealing against fluid under high pressure and at temperatures varying from very low to very high. The O-ring 34 surrounds and hugs one end of the tube 25, is enclosed in the sleeve 16 adjacent to the end 33, and is positioned intermediate the washer 32 and the split ring 23. I provide a second metallic washer 35, substantially identical with washer 32, enclosed by the cylindrical extension 18, surrounding the tube 26, and positioned intermediate the flange 19 on the nut 13 and the adjacent end 36 of the sleeve 16. I also provide a second O-ring 37 which is also resilient. The ring 37 surrounds the tube 26 and is enclosed in the end 36 of the sleeve 16. It is positioned intermediate the second metallic washer 35 and the split ring 24 which is as stated, at times positioned in the groove 22 of the sleeve 16.

The cylindrical male threaded coupling member 12, the nut 13, the cylinder 16, the metallic washer 32, the resilient O-ring 34, the second metallic washer 35, and the O-ring 37, thus provide means for sealing the end of the tubes 25 and 26 against leakage.

As stated above, in FIG. 3, the elements of the structure are shown in the position that they assume when the tubes 25 and 26 are spread apart. This sometimes occurs, for example, when the pressure is applied to the fluid within the tubes 25 and 26. When the tubes 25 and 26 move out, the beadings 27 and 29 move into contact with the split rings 23 and 24 respectively and force the split rings 23 and 24 by camming action into the grooves 21 and 22 respectively. The pressure of the fluid within the tubes 25 and 26 is sealed against leakage by the O-rings 34 and 37, which are always in sealing contact. The greater the fluid pressure, the more firmly the rings are forced by the fluid pressure into sealing contact with the washers 32 and 35, the external diameter of the tubes 25 and 26, and the internal surface of the ends 33 and 36 of the sleeve 16. The structure of the resilient split rings 23 and 24 is shown more clearly by consideration of FIG. 3 in combination with FIG. 4 and FIG. 5, wherein it may be seen that the ring 23 is split as at 41, 42, 43, and 44.

The ring 23 is U-shaped in cross section as shown in FIGS. 2 and 3 and is thus formed with a groove 45. In this groove there is placed a circular spring 46 which is shown in elevation in relaxed condition in FIG. 5 and which has a smaller diameter when relaxed than that of its ring 23. The spring 46 thus tends to hold the split ring 23 in the position shown in FIG. 2 in which the ring 23 (or 24) has its smallest diameter and in which it hugs snugly the external diameter of the associated fluid pressure conducting tube 25 (or 26).

The sleeve 16 is formed with a pair of external grooves 47 and 48 and the coupling member 12 and the nut 13 are formed with openings such as 51, 52, 53, 54, 55, and 56. These openings reduce the weight. Moreover, by reason of the openings, a wire 57 may be inserted through two pairs of these openings (e.g. 52, 53, 55 and 56) and in grooves 47 and 48 and secured to prevent displacement of the nut 13 relative to the male threaded coupling member 12 and thus lock the parts together. The openings 51–56 inclusive, etc. also serve the purpose that the interior of the coupling may be inspected visually, and it may be seen whether the parts 32 and 33 and the parts 35 and 36 are in intimate contact. Thus it is unnecessary to apply excessive torqueing in order to insure that the parts are in proper position.

Figure 6:
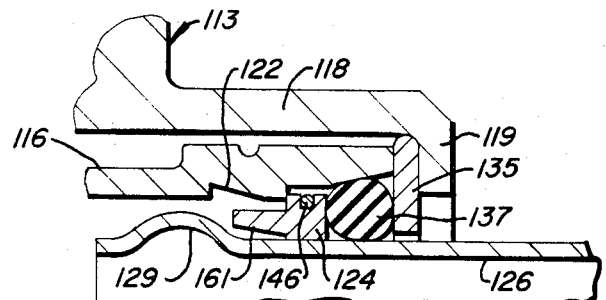
FIG. 6 is a fragmentary view in section (on a slightly larger scale) of an alternative structure similar to a portion of the structure shown in FIGS. 2 and 3, but using different forms of resilient split rings and back-up washers from those shown in the previous embodiment.
Figure 7:
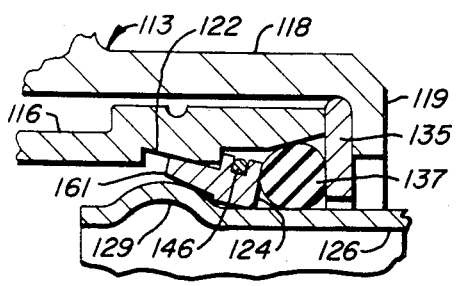
FIG. 7 is a fragmentary view in section similar to FIG. 6 but showing the split ring in the position it assumes when forced into its associated groove in the locked position.

The embodiment of which a fragment is shown in FIGS. 6 and 7 is similar to that shown in FIGS. 1, 2, and 3, and the various parts are designated by the same reference numerals with the addition of 100. However, the groove 122 is formed with one abrupt shoulder and with a tapered side, and the resilient split ring 124 is provided with a skirt extension 161 formed with a sloping portion, and it is this skirt extension 161 which is at times forced upwardly by the beading 129 into the groove 122 and thereupon it limits the separation of the tube 126 from its companion tube at the opposite end of the coupling. The farther the tubes are extended apart, the tighter is the jambing action of the skirt 161 into the groove 122. Nevertheless, when it is desired to disassemble the parts and when the tube 126 is moved to the left (in FIG. 6) the camming action of the tapered side of groove 122, acting on the skirt 161, together with the assistance of the spring 146, quickly releases the ring 124 so that there is no difficulty in disassembling the parts. The opposite end of the cylinder 116 corresponds to the end shown, and another split ring is provided corresponding to the ring 124.

In FIGURE 13 there is shown on an enlarged scale a portion of a structure corresponding to a portion of FIGURE 2. In this modification which is a preferred structure, the grooves as exemplified by the groove 21a are formed with a deeper shoulder toward the center of the sleeve 16a than towards the end. This is in order that the movement of the split rings such as 23a be limited so that there is no danger that the split rings be moved inwardly beyond the grooves. It is necessary that the movement of the split rings be limited in order to limit the movement of the O-rings. As stated above, this is the preferred construction, and I actually prefer that the grooves 21 and 22 be similarly formed.

Figure 8:
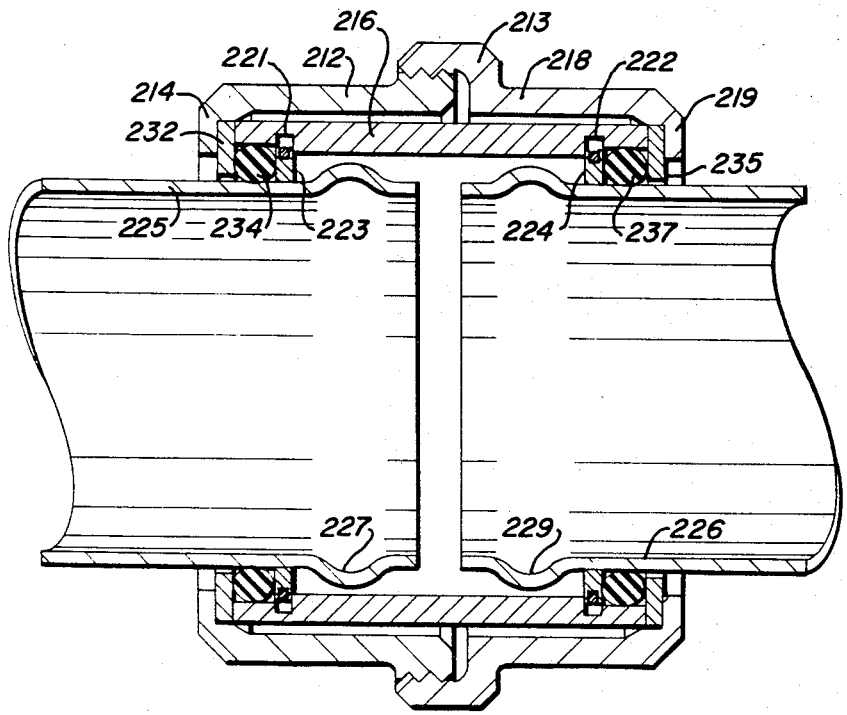
FIG. 8 is a view similar to FIG. 2 showing a different embodiment of my invention.

The embodiment shown in FIG. 8 is similar to that shown in FIGS. 2 and 3, and the parts are indicated by similar numerals with the addition of 200. Thus we have a cylindrical coupling member 212, a nut 213 having an extension 218, there being provided flanges 214 and 219 for the coupling member 212 and the nut 213 respectively. The washers 232 and 235 are resilient split washers but do not contain separate springs as do the washers 32 and 35, but the washers 223 and 224 are split washers with separate springs and are otherwise similar to the washers 23 and 24. The washers 223 and 224 may be constructed without springs if desired. The grooves 221 and 222 are formed with a deeper shoulder towards the center of the sleeve 216 than towards the ends for the same reasons as explained in connection with FIGURE 13 above.

The embodiment shown in FIGS. 9–12 corresponds in many respects with the structure shown in FIGS. 1–5 inclusive. Similar parts are designated by the same reference numerals with the addition of 300. Thus, there is shown a threaded coupling member 312 and a nut 313. The coupling member 312 has an internal flange 314 at one end and external threads 315 at the opposite end. The coupling member encloses the inner sleeve 316. The sleeve 316 is a split sleeve being formed in three sections 371, 372, and 373 the sections being held together by wire springs 374 and 375. The springs 374 and 375 are similar to springs 46 of the embodiment of FIGURES 1–5 and not only hold the sections 371, 372, and 373 together, but also tend to contract the split ring 316 to its smallest diameter.

The sections 371, 372, and 373 are substantially identical. Description in detail of section 372 as shown in section on the enlarged scale in FIG. 11 is to be understood therefore as descriptive of sectons 371 and 373 also. Section 372 is formed with flanges 376 and 377. These flanges are formed at their outer ends with grooves 378 and 379 respectively. The springs 374 and 375 are inserted and secured as by metal rolling or coining the side walls of the grooves 378 and 379 respectively.

The structure of the grooves 378 and 379 and of the springs 374 and 375 is shown more clearly in the showing of the groove 379 and the spring 375 in FIG. 12. It is to be understood that the sections 371, 372 and 373 are formed separately but when the wires 374 and 375 (which are substantially identical with the wire 46 shown in FIG. 5) are secured within the grooves 378 and 379, these three sections are serured flexibly together. Nevertheless the wires or spring are discontinuous, being split adjacent to the gaps 380a and 380b. Thus the sleeve 316 may be compressed until the gaps 380a and 380b are closed or may be extended by the application of force until the gaps 380a and 380b are considerably wider than shown. For example, when the beads 327 and 329 of tubes 325 and 326 are forced into the interior of the sleeve 316, the sleeve 316 is spread as far as it will go and is normally seated securely in the groove 381 which is to be next described.

As shown most clearly in FIG. 11, the coupling member 312 is formed with relatively wide and relatively shallow groove 381. When the sleeve 316 is in its contracted condition under the influence of the springs 374 and 375, it rides clear of the groove 381 and may be easily removed from the member 312 in order to disassemble the coupling. However, when the tubes 325 and 326 are moved apart as for example by fluid pressure, the camming action of the beading 327 and 329 forces the sleeve 316 as shown in FIG. 9 into the groove 381 and prevents axial displacement of the sleeve 316 relative to the coupling member 312. Similarly to the action of the springs 46 on the rings 23 and 24 as described above in connection with FIGS. 1–5 inclusive, the springs 374 and 375 tend as stated above, to contract the split ring 316 to its smallest diameter and, as indicated in FIG. 11, to withdraw from the groove 381.

The nut 313 is formed with an internal thread 317 and with an L shaped flange 319. Positioned inside of the flanges 314 and 319 respectively are washers 332 and 335. Interposed between the washer 332 and the flange 377 is an O-ring 334 and interposed between the washer 335 and the flange 376 is an O-ring 337.

The split ring 316 is provided for the purpose of cooperating with other parts of the coupling to prevent the movement apart of the tubes 325 and 326. It is not a fluid pressure sealing member. Sealing is accomplished by the O-rings 334 and 337 which are under compression and thus urged into sealing contact with the tubes 325 and 326, the washers 332 and 335 and the inner cylindrical surface of the coupling member 312. Because the split ring 316 is not a fluid pressure sealing member, it may be provided with cut-out portions as at 383, 385, and 387, so that weight of the coupling may be thereby reduced. The cut-out portions as well as the slits or divisions between the sections 371, 372, and 373 of the ring 316 provide for considerable flexibility thereof.

In FIG. 14 I have shown another embodiment of the sleeve used in my invention. The sleeve 416 may be used in my coupling in the place of sleeve 316 shown in FIGS. 9, 10, and 11. The sleeve 416 cooperates with coupling member 312, nut 313, and groove 381 in a manner similar to that of sleeve 316.

The sleeve 416 is a cylindrical unitary body having flanges 476 and 477 shown in FIGS. 14, 15, and 16. A plurality of slots parallel to the central axis of the sleeve (such as slots 490, 491, 492, 493, and 494) have been formed in alternate directions around the periphery of the sleeve. Each slot is terminated in a circular bore such as bores 495, 496, and 497. This termination prevents the extreme stress that would occur in the metal if termination was by sharp edges.

FIGURE 15 is a cross section through a slot taken along the line 15—15 shown in FIG. 14. FIG. 16 is a cross section between the slots taken along the lines 16—16 shown in FIG. 14.

FIGURES 15 and 16 show the groove 481 (corresponding to the groove 381 in FIG. 9) of the coupling meber 312. FIGS. 15 and 16 show the flanges 476 and 477. FIG. 15 shows the slot 493 and the bore 497. In FIG. 14 the distance between the sides of the slots is exaggerated in order to more clearly illustrate the sleeve 416. In practice, I prefer that the opposite sides of each slot almost touch when the collar is relaxed. The slots are actually made as narrow as possible so that the O-rings will not be able to deform partially into the slotted portion of the flanges 476 and 477 and thereby become abraded.

The sleeve 416, as described, is resilient without the need of any additional springs. It operates essentially the same as the sleeve 316. When the beads 327 and 329 of tubes 325 and 326 (shown in FIG. 9) are forced into the interior of the sleeve 416, the sleeve will spread and normally becomes seated securely in the groove 381.

Also in a manner essentially the same as already described in referring to sleeve 316, whenever the tubes 325 and 326 are moved apart, as for example by fluid pressure, the camming action of the beading 327 and 329 forces the sleeve 416 into the groove 381 and prevents axial displacement of the sleeve 416 relative to the coupling member 312. Thus it is clear that the sleeve 416 can be used in the coupling shown in FIG. 9 in place of the sleeve 316.

The sleeve 416 could be described as a sleeve, the flanges of which form the two rings surrounding the distal sides of the beading. Or the sleeve could be considered as a single ring.

The sleeve at all times tends to contract to its smallest diameter. This tendency is due to the elastic property of the metal used to construct the sleeve. The deformation of the metal, primarily in the area between each bore and the flange nearest to it, creates the elastic forces necessary to contract the sleeve.

Figure 17:
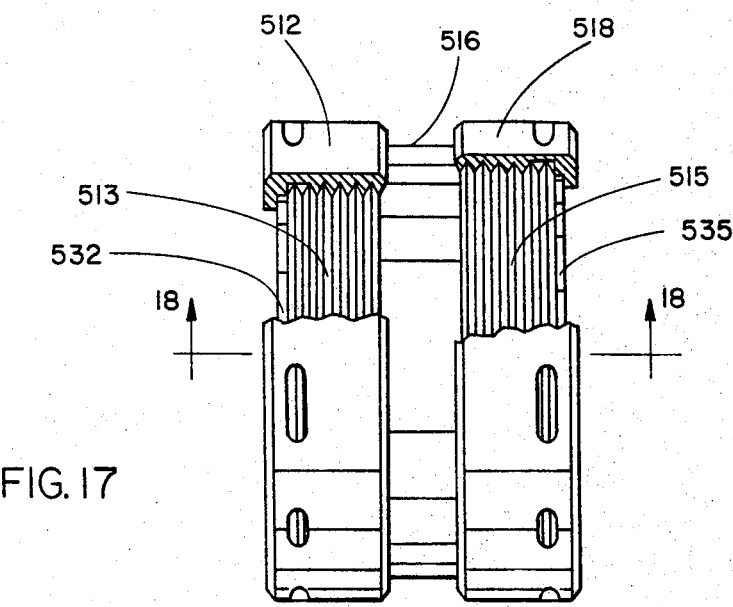
FIG. 17 is a view in front elevation (having a broken-out section) showing still another embodiment of my invention.

FIG. 17 shows yet another embodiment of my invention. That figure shows a cylindrical sleev 516 which has external threads 513 and 515 at each end. Except for these threads, sleeve 516 is similar to sleeve 216. Cylindrical nut members 512 and 518, having internal threads complementary to the external threads 513 and 515 on the sleeve 516, are threaded onto the sleeve 516. A pair of metallic washers 532 and 535 are also visible in FIG. 17. I have shown several radial holes or slots circumferentially formed around each of the nut members 512 and 518. These slots are optional. They reduce the weight of the coupling and provide means for inspecting the co-operation of the parts of the coupling. These holes also permit use of a lock wiring scheme similar to that shown in FIG. 1.

Figure 18:
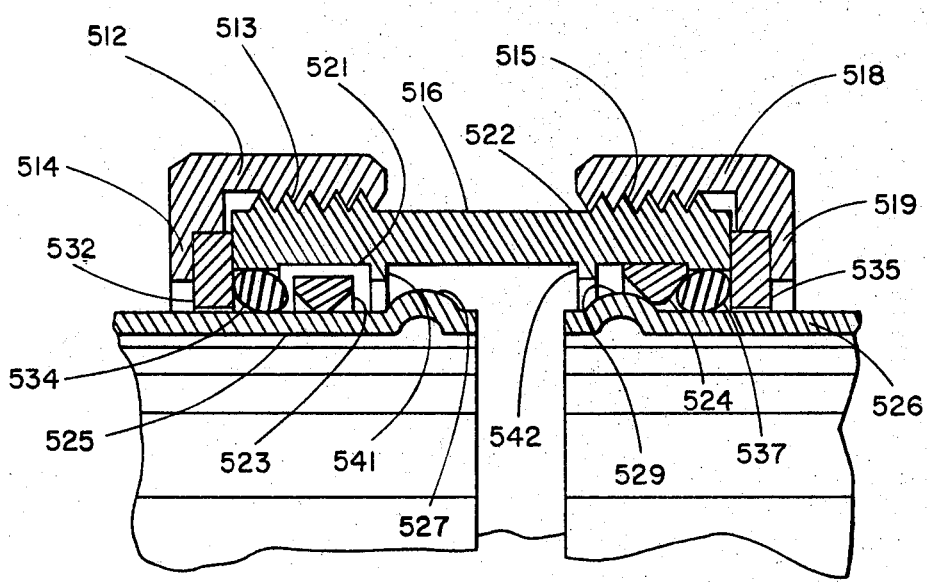
FIG. 18 is a view in section taken substantially along the line 18—18 of FIGURE 17 showing on a larger scale a portion of the coupling shown in FIGURE 17.

FIG. 18 shows further the details of the coupling shown in FIG. 17. The nut members 512 and 518 have annularly flanged ends 514 and 519 opposite their threaded ends. A pair of metallic washers 532 and 535 surround the tubes 525 and 526, are enclosed within nut members 512 and 518, and seat against the flanges 514 and 519.

The cylindrical sleeve 516, having end threads 513 and 515, butts against the washer 532 and 535. The sleeve 516, like the sleeve 216 (in FIGURE 8), has a pair of internal circumferential grooves 521 and 522. The innermost wall of each groove is shown in FIGURE 18 as formed by two inward, annular flanges 541 and 542. This particular groove configuration utilizing the flanges 541 and 542 is, of course, not necessary, and other groove configurations could be used. This configuration is preferred because it eliminates excess metal that might otherwise exist between the flanges 541 and 542.

A pair of resilient split rings 523 and 524 surround the tubes 525 and 526 on the distal side of the beads 527 and 529. The resiliency of these split rings is due to their own elasticity. They could, however, be constructed of several arcual segments held together and made resilient by a circular spring positioned in an outer circular groove in each split ring such as for example the rings 23 and 24 shown in FIGS. 1–4 inclusive.

These split rings 523 and 524 have bevelled edges and a triangular shape in cross section for improved camming action between them and the beads 527 and 529. Obviously, split rings of other cross sections could be used in the embodiment of FIG. 17 and FIG. 18. These split rings, like the others of my invention, tend to hug their associated tubes tightly.

A pair of resilient O-rings 534 and 537 surround the tubes 525 and 526 and are positioned between the washers 532 and 535 and the split rings 523 and 524. As in the other embodiments, these O-rings provide sealing.

It can be seen that in the embodiment shown in FIG. 17 and FIG. 18, I have eliminated the necessity for a major portion of the metal used to form the coupling member 212, the nut 213, and the extension 218 of the embodiment shown in FIG. 8. The importance of lower weight is obvious in couplings used in aircraft.

*Assembly, disassembly and operation*

The assembly and disassembly of my improved couplings are much easier and less difficult (in the confined places in which such couplings are often assembled and disassembled) than the devices of the prior art. Referring for example to the couplings shown in FIGS. 1, 2, and 3, I first provide a pair of fluid pressure conducting tubes 25 and 26. On the tube 25 I place first the male threaded coupling member 12 whereof the internal diameter of the flange 14 passes easily over the beading 27. This coupling is moved inward from the end 28 over the beading 27 and inward of the tubing 25. Then the split ring or washer 32 is expanded and slipped over the beading 27 and inward of the tubing 25. Then the resilient O-ring 34 is stretched and moved next to the washer 32. Then the resilient split ring 23 is expanded and slipped over the beading and up into contact with the O-ring 34. Then the sleeve 16 is moved on to the tube 25, its internal diameter obviously being much larger than the beading 27. On the tubing 26, corresponding parts are similarly assembled in the following order: the nut 13, the washer 35, the O-ring 37, and the split ring 24. Then the tubes 25 and 26 are brought into approximate alignment (the joint will assemble with 4° or more misalignment at each side) and the ends 28 and 30 are made to approach each other. Then the members 12, 32, 34, 23, and 16 are moved towards the end 28 of the tube 25. The members 24, 37, 35, and 13 are then moved on the surface of the tube 26 toward the end 30. Then the nut 13 is screwed up by hand on the coupling member 12 with the comparative ease of assembly. Hand torque is sufficient to telescope all parts into relative position regardless of the bead action or the split rings. At this point it is possible to look in through the holes (such as the holes 51–56 inclusive) and determine that the washer 32 is in contact with the end 33 and the washer 35 is in contact with the end 36.

The assembly of the coupling of FIGS. 9 to 11 is made in a similar manner. On the tube 325 I first place the coupling member 312, then the washer 332, then the O-ring 334, and finally the split ring 316, this ring being expanded to slide over the bead 327 and the member 312 being at the time pushed so far on the tube 325 that it does not interfere with this expansion and does not in fact contact the sleeve 316. Next the nut 313, the washer 335 and the O-ring 337 are similarly assembled on the tube 326. Now without bringing the coupling member 312 back to the end of the tube 325, the flanges 376 of the split ring are expanded so that they may be forced over the bead 329 as the tubes 325 and 326 are brought close together. Then the sleeve 316 being allowed to contract by operation of the springs 374 and 375, the coupling member 312 is telescoped over the sleeve 316. Next if the tubes 325 and 326 are pulled apart, the beads 327 and 329 expand the sleeve 316 and force it in the groove 381 to lock the coupling and prevent unwanted longitudinal displacement of the tubes 325 and 326. Though this may not take place at assembly, it will normally take place under operating conditions.

It will be noted that the washers 32, 35, 135, 232, 235, 332, and 335 do not hug the tubes 25, 26, 126, 225, 226, 325, and 326 at any time and thus allow the tubes 25, 26, 126, 225 and 226, 325 and 326 to twist or pivot relative to their cooperating tubes as may be necessary in adjusting for longitudinal alignment or slight misalignment of the tubes. The washers 32 and 35 may have auxiliary springs as indicated in FIGS. 2 and 3 but often such auxiliary springs are not necessary and structures similar to the structures of washers 135, 232, 235, 332, and 335 as shown in FIGS. 6, 7, 8, and 9, are satisfactory. These washers are resilient split rings but do not have auxiliary springs. When pressure is applied to the fluid in the tubes 25 and 26, it tends to cause the ends 28 and 30 to move apart and the beading 27 and the beading 29 are caused to come into contact with the resilient split rings 23 and 24, moving those rings into the grooves 21 and 22 and holding them there, and holding the tubes against unlimited axial displacement. The fluid in the tubes 25, 26, etc. is always sealed by the O-rings at the coupling joint. The greater the fluid pressure, the more the pressure acting on the O-rings 34 and 37 forces the O-ring 34 into tighter sealing contact with the tube 25, the washer 32, the end 33 of the sleeve 16, and forces the O-ring 37 into sealing contact with the tube 26, the washer 35, and the end 36 of the sleeve 16.

The embodiment shown in FIG. 17 and FIG. 18 operates in the same manner as does the embodiment of FIG. 8. The sleeve 516, the washers 532 and 535, the O-rings 534 and 537, and the split rings 523 and 524 operate as described above and as do the corresponding parts 216, 232, 235, 234, and 237 of FIG. 8.

In FIG. 18, the split ring 524 is shown forced into the groove 522 by the camming action of the bead 529. The split ring 523 is shown in a more relaxed position tightly surrounding the tube 525. The coupling of FIG. 17 and FIG. 18 is assembled in the following manner:

The nuts 512 and 518 are placed around the tubes 525 and 526 respectively; the washers 532 and 535 are expanded and passed over the beads 527 and 529; the O-rings 534 and 537 are slipped over the tubes; the split rings 523 and 524 are expanded and slipped over the beads; the ends of the tubes are inserted into the ends of the sleeve 516; and the nut members 512 and 518 are threaded onto the sleeve 516 until snug.

In all embodiments of my invention discussed above, positive locks are provided to prevent sliding of the structure which corresponds to member 316 of FIGURES 9–11 in the outer casing 312. Thus in the structure of FIGURES 9–11, the groove 381 prevents such sliding. In FIGURE 2 the flanges 14 and 19 (through the interposed washers 32 and 35) prevent the sleeve 16 and the split rings 23 and 24 (the sleeve and split rings being in one sense the equivalent of member 316) from sliding relative to the outer casing 11.

This is most important for two reasons. First, should any axial load on one of the tubes such as 25 and 26 be reacted by an equal load in a location other than on the other tube, the sleeve 16 would (except for the above locking feature) tend to slide and extrude the O-ring. Second, should a failure occur in the sleeve 316, it would most likely be in bending as at the juncture between the flange 376 and the main cylindrical body of the sleeve 316. Thereupon the flange 376 acts as a washer (corresponding for instance in some respects to split rings 23 and 24 of FIGURE 2) thus acting to protect the O-ring from extrusion and providing a backup safety feature to prevent the failure from resulting in a possible catastrophe.

In applying the discussion in the last two paragraphs to the structure of FIGURES 6 and 8 for example, it is obvious that 116 and 216 correspond to 16 and 316; 124 and 224 correspond to 24; and 223 corresponds to 23.

It is to be understood that the above described embodiments of my invention are for the purpose of illustration only, and various changes may be made therein without departing from the spirit and scope of the invention.

I claim:

1. A coupling for connecting and sealing a pair of fluid pressure conducting tubes, the tubes being arranged in end to end relationship with the ends thereof in substantial alignment and in spaced relationship to each other, each tube having an external beading adjacent the end thereof and the external surfaces of the tubes being of substantially uniform diameter on the distal side of the beading, said coupling comprising:
  (1) means for holding said tubes to limit the longitudinal displacement thereof comprising:
    (a) a substantially cylindrical substantially rigid integral sleeve surrounding the beaded end portions of the tubes and formed with a pair of internal circumferential grooves; and
    (b) a pair of resilient split rings each surrounding said distal side of one of the tubes, each resiliently in its relaxed condition tending to adjust to a position of smallest possible diameter and thus tending to hug the associated tube tightly but each being expanded and each being partially positioned in one of said grooves when said tubes are moved apart to their limit of movement and when then contacted by a side of the external beading of one of said tubes opposite to the end of the tube; and
  (2) means for sealing the ends of said tubes against leakage comprising:
    (a) a cylindrical coupling member having an annular internal flange at one end and external threads at the opposite end and enclosing one end of said sleeve;
    (b) said cylindrical integral sleeve;
    (c) a metallic washer enclosed by said coupling member and positioned between the flange and the adjacent end of the sleeve;
    (d) a resilient O-ring surrounding one end of one of said tubes, enclosed in the sleeve, and positioned between said washer and one of the split rings, said O-ring engaging said tube, said sleeve, said metallic washer, and said split ring;
    (e) a nut forming a complementary coupling member, having internal threads threaded on the threads of said cylindrical coupling member, formed with a cylindrical extension corresponding substantially to the body of said coupling member, enclosing the other end of said sleeve, and having an annular internal flange at the end of said cylindrical extension opposite to said internal threads;
    (f) a second metallic washer enclosed by said cylindrical extension and positioned between the flange on the nut and the adjacent end of the sleeve which is opposite to the first mentioned metallic washer; and
    (g) a second resilient O-ring surrounding one end of the other of said tubes, enclosed in the sleeve, and positioned intermediate said second metallic washer and the other split ring and engaging the other of said tubes, said sleeve, said second metallic washer and said other split ring, said internal flanges, said O-rings, and said metallic washers acting as means to position said split rings so that the beading on the associated tubes engage the split rings and move the rings outwardly into the respective grooves of the integral sleeve.

2. The structure of claim 1 in which the resilient split rings each comprise a ring U-shaped in cross section and split so as to consist of a plurality of arcual parts, and a circular spring, positioned in the groove formed by the legs of the U, and having, in its relaxed condition, an outside diameter smaller than the outside diameter of the split ring.

3. The structure of claim 1 in which the internal grooves in the sleeve are formed with one abrupt side and with one tapered side, and in which the resilient split rings are provided with a tapered skirt which extends into and co-acts with the tapered groove.

4. The structure of claim 1 in which the sides toward the center of the internal circumferential grooves in the sleeve are longer than the sides of the grooves toward the end of the sleeve.

5. The structure of claim 1 in which the metallic washers are both resilient extensible members.

6. A coupling for connecting and sealing a pair of fluid pressure conducting tubes, the tubes being arranged in end to end relationship with the ends thereof in substantial alignment and in spaced relationship to each other, each tube having an external beading adjacent the end thereof and the external surfaces of the tubes being of substantially uniform diameter on the distal side of the beading, said coupling comprising:
  (1) means for holding said tube to limit the longitudinal displacement thereof, consisting of:
    (a) a substantially cylindrical substantially rigid integral sleeve surrounding the beaded end portions of the tubes and formed with a pair of internal circumferential grooves; and
    (b) a pair of resilient split rings each surrounding the distal side of one of the tubes, each resiliently in its relaxed condition tending to adjust to a condition of smallest possible diameter and thus tending to hug the associated tubes tightly, but each being expanded and each being partially positioned in one of said grooves when said tubes are moved apart to their limit of movement and when then contacted by a side of the external beading of one of said tubes opposite to the end of the tube; and
  (2) means for sealing the ends of said tubes against leakage consisting of:
    (a) an outer cylindrical perforate coupling member having an annular internal flange at one end, external threads at the opposite end and enclosing one end of said sleeve;
    (b) said cylindrical integral inner sleeve;
    (c) a metallic washer enclosed by said coupling member and positioned between the flange and the adjacent end of the sleeve;
    (d) a resilient O-ring surrounding one end of one of said tubes, enclosed in the sleeve, and positioned between said washer and one of the split rings, said O-ring engaging said tube, said sleeve, said metallic washer, and said split ring;

(e) an outer perforate nut forming a complementary coupling member, having internal threads, threaded on the threads of said outer cylindrical coupling member, formed with a cylindrical extension corresponding substantially to the body of said coupling member, enclosing the other end of said sleeve, and having an annular internal flange at the end of said cylindrical extension opposite to said internal threads;

(f) a second metallic washer enclosed by said cylindrical extension and positioned between the flange on the nut and the adjacent end of the sleeve which is opposite to the first mentioned metallic washer; and (g) a second resilient O-ring surrounding one end of the other of said tubes, enclosed in the sleeve, and positioned intermediate said second metallic washer and the other split ring and engaging the other of said tubes, said sleeve, said second metallic washer, and said other split ring; said internal flanges, said O-rings, and said metallic washer acting as means to position said split rings so that the beading on the associated tubes engages the split ring and moves the rings outwardly into the respective grooves of the integral sleeve.

7. A coupling for connecting and sealing a pair of fluid pressure conducting tubes, the tubes being arranged in end to end relationship with the ends thereof in substantial alignment and in spaced relationship to each other, each tube having an external beading adjacent the end thereof and the external surfaces of the tubes being of substantially uniform diameter on the distal side of the beading, said coupling comprising;

(1) means for holding said tubes to limit the longitudinal displacement thereof comprising:

(a) a substantially cylindrical sleeve surrounding the beaded end portions of both of the tubes; and (b) means associated with said sleeve and in effect forming a pair of annular flanges extending inward from said sleeve adjacent to the ends of said sleeve for surrounding and contacting both of said tubes on the distal sides of said beading, one surrounding and contacting the distal side of one of said tubes and the other surrounding and contacting the distal side of the other of said tubes, each of said flanges being inwardly resilient so as to tend to move always into snug contact with the external diameter of said tube;

(2) means for sealing the ends of said tubes against leaking comprising:

(a) a substantially cylindrical coupling assembly having an annular internal flange at each end and enclosing said sleeve, said coupling assembly comprising (1) a cylindrical coupling member having an annular internal flange at one end and external threads at the opposite end, and (2) a nut forming a complementary coupling member, having internal threads threaded on the external threads of said cylindrical coupling member, and having an annular internal flange at the end of said nut opposite to said internal threads;

(b) a pair of metallic washers enclosed by said coupling assembly and each positioned between one of the coupling flanges and the adjacent end of the sleeve; and (c) a pair of resilient O-rings each surrounding one end of one of said tubes, and each positioned between one of said washers and said means for surrounding and contacting one of said tubes on the distal side of said tubing which is in effect an annular flange extending inward from said sleeve, said O-ring engaging said tube, said metallic washer, and said effective annular flange; and (3) means for locking said sleeve against longitudinal movement relative to said coupling assembly.

8. The structure of claim 7 in which said cylindrical sleeve is formed with a pair of internal circumferential grooves and the means associated with said sleeve and in effect forming a pair of annular flanges extending inward from said sleeve adjacent to the ends of said sleeve for surrounding and contacting both of said tubes on the distal sides of said beading comprises a pair of resilient split rings each partially surrounding the distal side of one of the tubes, each resiliently in its relaxed condition tending to adjust to a position of smallest possible diameter and thus tending to hug the associated tube tightly but each being partially positioned in one of said grooves when said tubes are moved apart to their limit of movement and when then contacted by a side of the external beading of one of said tubes opposite to the end of the tube.

9. The structure of claim 7 in which said cylindrical sleeve is formed with a pair of internal circumferential grooves and the means for locking said sleeve against longitudinal movement relative to said coupling assembly comprises a pair of resilient split rings each partially surrounding the distal side of one of the tubes, each resiliently in its relaxed condition tending to adjust to a position of smallest possible diameter and thus tending to hug the associated tube tightly but each being partially positioned in one of said grooves when said tubes are moved apart to their limit of movement and when then contacted by a side of the external beading of one of said tubes opposite to the end of the tube;

said pair of metallic washers enclosed in said coupling assembly; and a pair of extensions on the ends of said sleeve, each overlying one of said O-rings radially outward from one of said fluid pressure conducting tubes and extending into contact with one of said washers, the O-rings each engaging the internal surface of one of said extensions as well as one of said tubes, one of said metallic washers, and one of said resilient split rings, and thus protecting said O-ring against crushing.

10. The structure of claim 7 in which the means associated with said sleeve and in effect forming a pair of annular flanges extending inward from said sleeve adjacent to the ends of said sleeve for surrounding and contacting both of said tubes on the distal sides of said beading comprises a pair of integral internal annular flanges formed on the ends of said sleeve each surrounding and contacting the distal side of one of the tubes, and each flange held in snug contact with the external diameter of said tube by means of an inwardly resilient force acting thereon.

11. The structure of claim 7 in which the means for locking said sleeve against longitudinal movement relative to said coupling assembly comprises a pair of integral internal annular flanges formed on the ends of said sleeve each surrounding and contacting the distal side of one of the tubes, and each flange held in snug contact with the external diameter of said tube by means of an inwardly resilient force acting thereon, and a relatively wide and shallow groove being formed on an internal cylindrical surface of said coupling assembly within which a portion of the external cylindrical surface of said cylindrical sleeve is at times positioned when said coupling is operatively assembled.

12. The structure of claim 7 in which the means for locking said sleeve against longitudinal movement relative to said coupling assembly comprises:
(1) a pair of integral internal annular flanges formed on the ends of said sleeve each surrounding and contacting the distal side of one of the tubes, and each flange held in snug contact with the external diameter of said tube by means of an inwardly resilient annular spring attached to each of said flanges; and
(2) a relatively wide and shallow groove formed on an internal cylindrical surface of said coupling assembly within which a portion of the external cylindrical surface of said cylindrical sleeve is positioned when said tubes are subjected to forces created by fluid pressure or by longitudinal pull on or bending of said tubes and which cylindrical sleeve, in the absence of said forces, tends to be withdrawn from said groove into snug contact with the external diameters of said tubes by means of said inwardly resilient annular springs.

13. The structure of claim 7 in which the means for locking said sleeve against longitudinal movement relative to said coupling assembly comprises
(1) a pair of integral annular flanges formed on the ends of said sleeve each surrounding and contacting the distal side of one of the tubes, and each flange held in snug contact with the external diameter of said tube by means of elastic forces of said sleeve; and
(2) a relatively wide and shallow groove formed on an internal cylindrical surface of said coupling assembly within which a portion of the external cylindrical surface of said cylindrical sleeve is positioned when said tubes are subjected to forces created by fluid pressure or by longitudinal pull on or bending of said tubes, and which cylindrical sleeve, in the absence of said forces, tends to be withdrawn from said groove into snug contact with the external diameters of said tubes by means of said elastic forces.

14. The structure of claim 7 wherein said means for holding said tubes to limit the longitudinal displacement thereof comprises:
a substantially cylindrical sleeve surrounding the beaded end portions of both of the tubes, said sleeve having
(a) a pair of integral internal anular flanges formed on the ends of said sleeve each surrounding and contacting the distal side of one of the tubes; and
(b) a plurality of longitudinal slots alternately extending from the sleeve ends to points between the sleeve ends.

15. A coupling for connecting and sealing a pair of fluid pressure conducting tubes, the tubes being arranged in end to end relationship with the ends thereof in substantial alignment and in spaced relationship to each other, each tube having an external beading adjacent the end thereof and the external surfaces of the tubes being of substantially uniform diameter on the distal side of the beading, said coupling comprising:
(1) means for holding said tubes to limit the longitudinal displacement thereof comprising:
(a) a substantially cylindrical substantially rigid integral sleeve surrounding the beaded end portions of the tubes, formed with a pair of internal circumferential grooves, and having external threads at each end; and
(b) a pair of resilient split rings each surrounding said distal side of one of the tubes, each resiliently in its relaxed condition tending to adjust to a position of smallest possible diameter and thus tending to hug the associated tube tightly but each being expanded and each being partially positioned in one of said grooves when said tubes are moved apart to their limit of movement and when then contacted by a side of the external beading of one of said tubes opposite to the end of the tube; and
(2) means for sealing the ends of said tubes against leakage comprising:
(a) a pair of nut members each having internal threads at one end threaded on the threads at an end of said sleeve, and having an annular internal flange at the end opposite said internally threaded end;
(b) said cylindrical integral sleeve;
(c) a pair of metallic washers each enclosed by one of said nut members and positioned between the flange and the adjacent end of the sleeve; and
(d) a pair of resilient O-rings each surounding one end of one of said tubes, enclosed in the sleeve, and positioned between one of said washers and one of the split rings, said O-rings each engaging one of said tubes, said sleeve, one of said metallic washers, and one of said split rings.

16. The structure of claim 15 in which the resilient split rings each comprise a ring having bevelled inner edges.

17. The structure of claim 15 in which the sides of the grooves toward the center of the internal circumferential grooves in the sleeve are longer than the sides of the grooves toward the end of the sleeve.

18. The structure of claim 15 in which the resilient split rings each comprise a ring having bevelled inner edges and an outer circular groove, split so as to consist of a plurality of arcual parts, and a circular spring, positioned in the outer circular groove, having, in its relaxed condition, an outside diameter smaller than the outside diameter of the split ring.

References Cited
UNITED STATES PATENTS
| | | | |
|---|---|---|---|
| 2,590,565 | 3/1952 | Osborn | 285—369 X |
| 2,826,437 | 3/1958 | Detweiler et al. | 285—369 X |
| 2,918,313 | 12/1959 | Lazar et al. | 285—233 X |
| 2,967,723 | 1/1961 | Willis | 285—233 |
| 2,971,781 | 2/1961 | Torres | 285—233 |
| 3,002,771 | 10/1961 | Chakroff | 285—233 X |
| 3,031,213 | 4/1962 | Bruning et al. | 285—233 |

FOREIGN PATENTS
| | | |
|---|---|---|
| 327,557 | 3/1903 | France. |
| 382,966 | 11/1932 | Great Britain. |
| 515,002 | 11/1939 | Great Britain. |

EDWARD C. ALLEN, *Primary Examiner.*

THOMAS J. CALLAGHAN, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,405,957                                          October 15, 1968

Richard O. Chakroff

It is certified that error appears in the above identified patent and that said Letters Patent are hereby corrected as shown below:

Column 7, line 32, "serured" should read -- secured --. Column 8, line 24, "481" should read -- 381 --. Column 9, line 8, "washer" should read -- washers --. Column 13, lines 26 and 27, "beading on the associated tubes engages" should read -- beading of the associated tubes engage --.

Signed and sealed this 3rd day of March 1970.

(SEAL)
Attest:

Edward M. Fletcher, Jr.                          WILLIAM E. SCHUYLER, JR.
Attesting Officer                                        Commissioner of Patents